US012576419B2

(12) United States Patent

Feenstra et al.

(10) Patent No.: US 12,576,419 B2

(45) Date of Patent: Mar. 17, 2026

(54) PROTECTIVE COVER AND INSTALLATION TOOL FOR FIRE PROTECTION SPRINKLERS

(71) Applicant: Minimax Viking Patent Management GmbH, Bad Oldesloe (DE)

(72) Inventors: Shawn J. Feenstra, Caledonia, MI (US); Gary William Pleyte, Hastings, MI (US)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 594 days.

(21) Appl. No.: 17/947,233

(22) Filed: Sep. 19, 2022

(65) Prior Publication Data

US 2023/0088036 A1 Mar. 23, 2023

Related U.S. Application Data

(60) Provisional application No. 63/247,630, filed on Sep. 23, 2021.

(51) Int. Cl.

*B05B 15/16* (2018.01)

*A62C 35/68* (2006.01)

(52) U.S. Cl.

CPC .............. *B05B 15/16* (2018.02); *A62C 35/68* (2013.01)

(58) Field of Classification Search

CPC ......... B05B 15/14; B05B 15/16; A62C 31/02; A62C 37/12; A62C 31/28; H01R 4/22; H01R 13/622; B25G 1/102

See application file for complete search history.

(56) References Cited

U.S. PATENT DOCUMENTS

| | | | |
|---|---|---|---|
| 4,176,756 | A | 12/1979 | Gellman |
| 6,098,256 | A | 8/2000 | Poussard |
| 6,487,942 | B1 | 12/2002 | Carter et al. |
| 6,669,111 | B2 | 12/2003 | Vinson et al. |
| 7,055,614 | B1 | 6/2006 | Ide |
| 7,185,567 | B2 | 3/2007 | Ide |
| 7,273,189 | B2 | 9/2007 | Ide et al. |
| 7,540,330 | B2 | 6/2009 | Orr et al. |
| 7,757,967 | B1 | 7/2010 | Yang |
| 7,891,716 | B2 | 2/2011 | Orr et al. |
| 7,900,852 | B2 | 3/2011 | Feenstra |
| 8,297,663 | B2 | 10/2012 | Spears |
| 8,469,111 | B2 | 6/2013 | Orr et al. |
| 8,662,191 | B2 | 3/2014 | Orr et al. |
| 8,905,151 | B2 | 12/2014 | Silva, Jr. et al. |
| 9,027,660 | B2 | 5/2015 | Oldham |
| 9,320,929 | B2 | 4/2016 | Koiwa |
| 9,463,343 | B2 | 10/2016 | Koiwa |
| 9,630,039 | B2 | 4/2017 | Koiwa |
| 10,376,724 | B2 | 8/2019 | Macomber |
| 10,737,371 | B2 | 8/2020 | Watson et al. |
| 10,744,527 | B2 | 8/2020 | Jackson |

(Continued)

FOREIGN PATENT DOCUMENTS

| | | |
|---|---|---|
| GB | 126753 | 5/2019 |

*Primary Examiner* — Tuongminh N Pham

(74) *Attorney, Agent, or Firm* — Perkins Coie LLP

(57) ABSTRACT

A device and method of protecting and installing a fire protection sprinkler. The device includes a tubular cap that axially receives the sprinkler. The device also includes torque assist features including an external rotational drive feature and an internal rotational drive feature.

20 Claims, 7 Drawing Sheets

(56) References Cited

U.S. PATENT DOCUMENTS

| | | | | |
|---|---|---|---|---|
| 10,940,348 | B2 | 3/2021 | Oldham et al. | |
| 10,940,349 | B2 | 3/2021 | Schnell et al. | |
| 11,160,999 | B2 | 11/2021 | Koiwa | |
| 11,872,425 | B2 | 1/2024 | Feenstra et al. | |
| 12,157,022 | B2 | 12/2024 | Watson et al. | |
| 12,257,465 | B2 | 3/2025 | Feenstra et al. | |
| 2002/0050387 | A1* | 5/2002 | Blaha | H01R 13/5025<br>174/87 |
| 2006/0060671 | A1* | 3/2006 | Orr | A62C 31/02<br>239/523 |
| 2007/0256844 | A1 | 11/2007 | Blasing et al. | |
| 2019/0175968 | A1 | 6/2019 | Pressnell | |
| 2022/0203395 | A1 | 6/2022 | Pleyte et al. | |
| 2023/0087195 | A1 | 3/2023 | Workman et al. | |
| 2023/0089748 | A1 | 3/2023 | Watson et al. | |
| 2023/0090915 | A1 | 3/2023 | Scheffers et al. | |
| 2023/0100701 | A1 | 3/2023 | Feenstra et al. | |
| 2023/0101096 | A1 | 3/2023 | Watson et al. | |

* cited by examiner

PROTECTIVE COVER AND INSTALLATION TOOL FOR FIRE PROTECTION SPRINKLERS

PRIORITY DATA & INCORPORATION BY REFERENCE

This application claims the benefit of priority to U.S. Provisional Patent Application No. 63/247,630, filed on Sep. 23, 2021, which is incorporated by reference in its entirety.

TECHNICAL FIELD

The present invention relates generally to protection devices and installation tools for fire protection sprinklers and systems. In particular, the present invention relates to a protective cover and installation tool for fire protection sprinklers.

BACKGROUND ART

Fire protection sprinklers include a sprinkler frame body with an inlet connected to a pressurized supply of firefighting fluid, such as water, and some type of fluid deflection member spaced from an outlet of the frame body to distribute firefighting fluid discharged from the outlet in a defined spray distribution pattern over an area to be protected. In some fire protection sprinklers, the release of fluid discharge from the sprinkler body is controlled. For example, automatic fire protection sprinklers include a fusible or thermally responsive trigger assembly which secures a seal assembly over an internal central orifice formed proximate the outlet of the frame body. When the temperature surrounding the automatic sprinkler is elevated to a pre-selected value indicative of a fire, the trigger assembly operates, fractures or collapses to release the seal assembly and fluid flow is initiated through the sprinkler body and out the outlet to impact the fluid deflection member. In contrast to the passive operation of the fusible or thermally responsive trigger assembly and seal assembly of an automatic fire protection sprinkler, other types of fire protection sprinklers have a controlled operation trigger assembly and seal assembly. For example, in such controlled operation, the trigger assembly and seal assembly are actuated in response to a control signal, and, in such actuated sprinklers, the trigger assembly and/or seal assembly is operated or otherwise ejected by a mechanical, electrical or computer-controlled actuator.

The response and actuation of the sprinkler is based upon the thermally responsive trigger; and the spray pattern or distribution of the firefighting fluid is defined by the fluid deflection member configuration. Accordingly, proper sprinkler performance is a function of these operative components. In order to maintain the expected performance of the sprinkler, there is a need to protect the automatic fire protection sprinkler from unintended impact and/or damage. Known fire protection covers are shown and described in U.S. Pat. Nos. 6,669,111; 7,540,330; 7,757,967; and 7,900,852. Generally, these known protective devices are axially disposed over the sprinkler to protect the fluid deflection member and the thermally responsive trigger. Alternatively, the protective device is strapped about the sprinkler frame between the frame body and the fluid protection member to protect the thermally responsive trigger. These known protective sprinkler covers are made from plastic and are affixed about the sprinkler to protect the sprinkler during storage, transport, handling and/or during the installation process.

Once the sprinkler is properly installed in the branch connector, the protective device can be removed to place the sprinkler into service.

Fire protection sprinklers are used, for example, in the protection of storage commodities and occupancies. Storage fire protection systems include a network of pipes connected to a firefighting fluid supply and installed above the storage commodity beneath the ceiling of the occupancy. The piping network includes one or more branch lines coupled to a cross-main which is connected to a fluid supply by a vertical piping riser to supply the branch line(s) with the firefighting fluid. Fire protection sprinklers are connected to the branch lines in an appropriate orientation and at an appropriate sprinkler-to-sprinkler spacing.

To connect the fire protection sprinklers to the branch lines, the branch lines are configured as linear pipe headers with branch connectors extending from the header for receipt and threaded connection of a fire protection sprinkler. Known connectors have one inlet end configured for welded connection to the pipe header and an opposite outlet end with a tapered threaded end for connection of a sprinkler. In order to form a fluid tight seal between the threadedly engaged connector and the sprinkler, a sealing tape or putty is be applied to the sprinkler. In order to form a fluid tight seal between the cooperating tapered threads, the sprinkler must be properly torqued using a wrench.

There are also known branch connectors which eliminate either or both of the tapered thread connection or the need to apply a sealing tape or putty. For example, each of U.S. Pat. Nos. 8,297,663 and 10,744,527 and U.S. Patent Publication No. 2019/0175968 show and describe connectors or adapters for connecting a fire protection sprinkler to a pipe header. Each of these known connectors use an internal straight thread at the outlet to connect the tapered thread of the fire protection sprinkler, which allows the sprinkler to be placed in a desired rotational orientation without the interference of the thread engagement. To form a fluid tight seal between the connector and the sprinkler, each of the connectors employ an internal annular seal member. The sprinkler is then threaded into the connector and sufficiently torqued to form the fluid tight connection.

In order to maintain protection of the sprinkler during the installation process it is preferred to keep a protective device on the sprinkler. This can create a problem for properly torquing the sprinkler to form a fluid tight seal. Some known protective devices engage the sprinkler to accommodate a wrench or other installation tool. Other known protective devices on the sprinkler frame can interfere or prevent proper wrench engagement. Moreover, it is problematic trying to use the known protective device to directly torque the sprinkler because these known protective devices are not configured to sufficiently grasp the sprinkler frame and transfer a torque sufficient to form a fluid tight sealed connection. For example, U.S. Pat. No. 7,540,330 describes a tubular or cylindrical cover that flexes, stretches and flattens upon engagement with a sprinkler to secure the cover about the sprinkler and then disengage upon application of a sufficient torque or rotational force. Accordingly, there is a need for sprinkler protective devices that can protect operative components of the sprinkler during storage, transport handling and installation and also sufficiently transfer a torque to form a fluid tight sealed connection between a sprinkler and a branch connector.

DISCLOSURE OF THE INVENTION

Preferred embodiments of a device and method are provided for protecting and installing a fire protection sprinkler having a frame with a body and a pair of spaced apart frame arms extending from the body, a fluid deflection member coupled to the frame arms and spaced from the body with a thermally responsive trigger assembly coaxially disposed between the body and the fluid deflection member. As shown in FIG. 2A, the fluid deflection member, in preferred embodiments, is a fluid deflector. Preferred embodiments of the protective installation device includes a tubular body having a first end defining an opening for axially receiving the fire protection sprinkler, a second end centered about the central axis and axially spaced from the first end, and an internal volume between the first end and the second end for housing a portion of the received sprinkler. The device also includes a torque assist feature for transferring a torque to the sprinkler to install the sprinkler within a branch connector or other.

In one preferred embodiment of a protective installation device for a fire protection sprinkler includes a tubular body having a first end defining an opening for axially receiving the fire protection sprinkler, a second end axially spaced from the first end along a central axis, and a wall between the first end and the second end that continuously circumscribes the central axis to define an internal void of the body for housing a portion of the received sprinkler. At least one external rotational drive formation of the wall includes a first external surface portion of the wall and a second external surface portion of the wall contiguous with the first external surface portion. The first external surface portion extends in an outward direction from the second external surface portion to define an external inflection in the wall. The preferred rotational driver formation provides a torque assist feature of the device.

Accordingly, the preferred protection and installation device provides for a preferred protected fire protection sprinkler assembly that includes a fire protection sprinkler with a frame having a body having an external thread, an inlet, an outlet, an internal passageway extending between the inlet and the outlet along a central sprinkler axis, and a pair of spaced apart frame arms disposed in a plane and extending axially from the body. A fluid deflection member is affixed to the frame arms and centered along the central sprinkler axis with a thermally responsive trigger assembly aligned along the central sprinkler axis. The protected sprinkler assembly includes a preferred protection and installation device axially engaged with the fire protection sprinkler. The preferred device includes a tubular body having a first end defining an opening for axial receipt of the fire protection sprinkler, a second end axially spaced from the first end for at least partially shielding the fire protection sprinkler, and a shielding wall between the first end and the second end defining a continuous geometry circumscribed about a central device axis and an internal void for housing the fire protection sprinkler. The tubular body preferably has a torque assist feature defined by at least one external rotational drive formation and at least one internal rotational drive formation. The external rotational drive formation includes a first segment of the wall and a second segment of the wall contiguous with the first segment that extends in an outward direction from the first segment to define an external inflection in the continuous geometry and form a lever for applying a torque to the protected fire protection sprinkler assembly. The internal rotational drive formation confronting one arm in the pair of arms for transferring the applied torque to the frame arm for rotation of the fire protection sprinkler about the central sprinkler axis within a threaded branch connector in a threaded engagement with the external thread of the sprinkler frame body.

Embodiments of the preferred protection and installation device provide a preferred method of installing a fire protection sprinkler that includes axially receiving the sprinkler within an internal void of the device having a first open end, a second end, and a wall between the first end and the second end that is continuously circumscribed about a central axis to define the internal void. The preferred method also includes applying a torque to an external rotational drive formation of the device to form a fluid tight connection between the sprinkler body and a branch connector or other appropriate fitting.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1A:
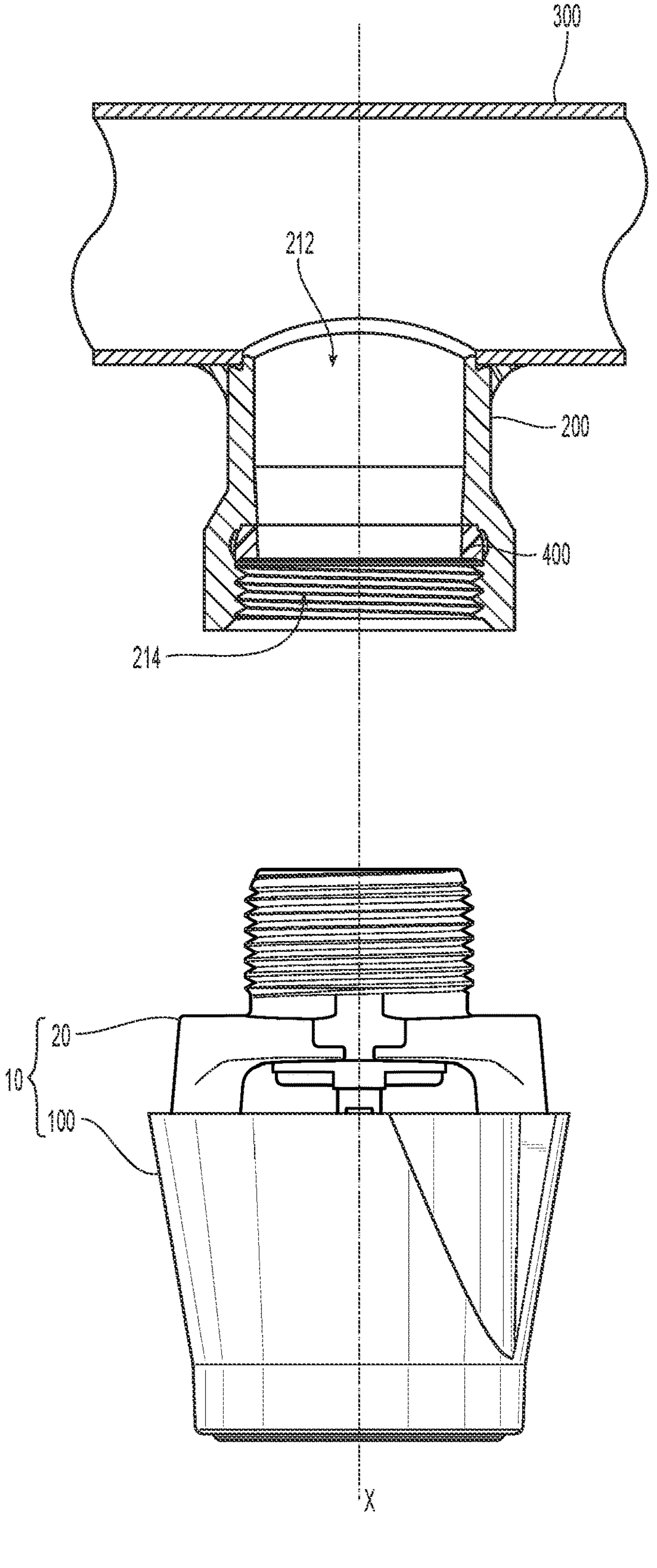
FIG. 1A is an exploded view of a preferred embodiment of a protected sprinkler assembly coupled to a branch connector.
Figure 1B:
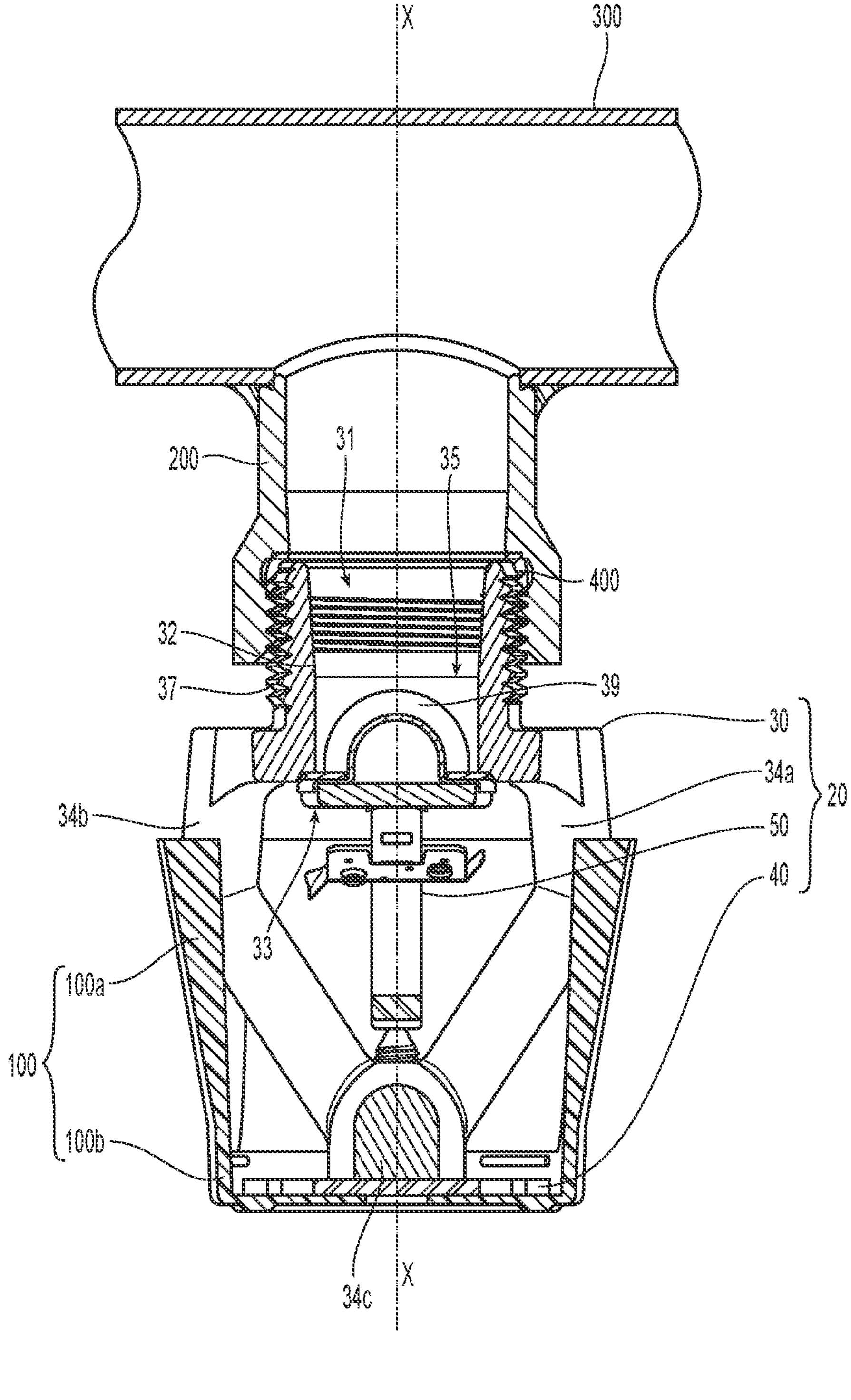
FIG. 1B is a cross-sectional view of the protected sprinkler assembly and branch connector of FIG. 1A coupled to one another.
Figure 2A:
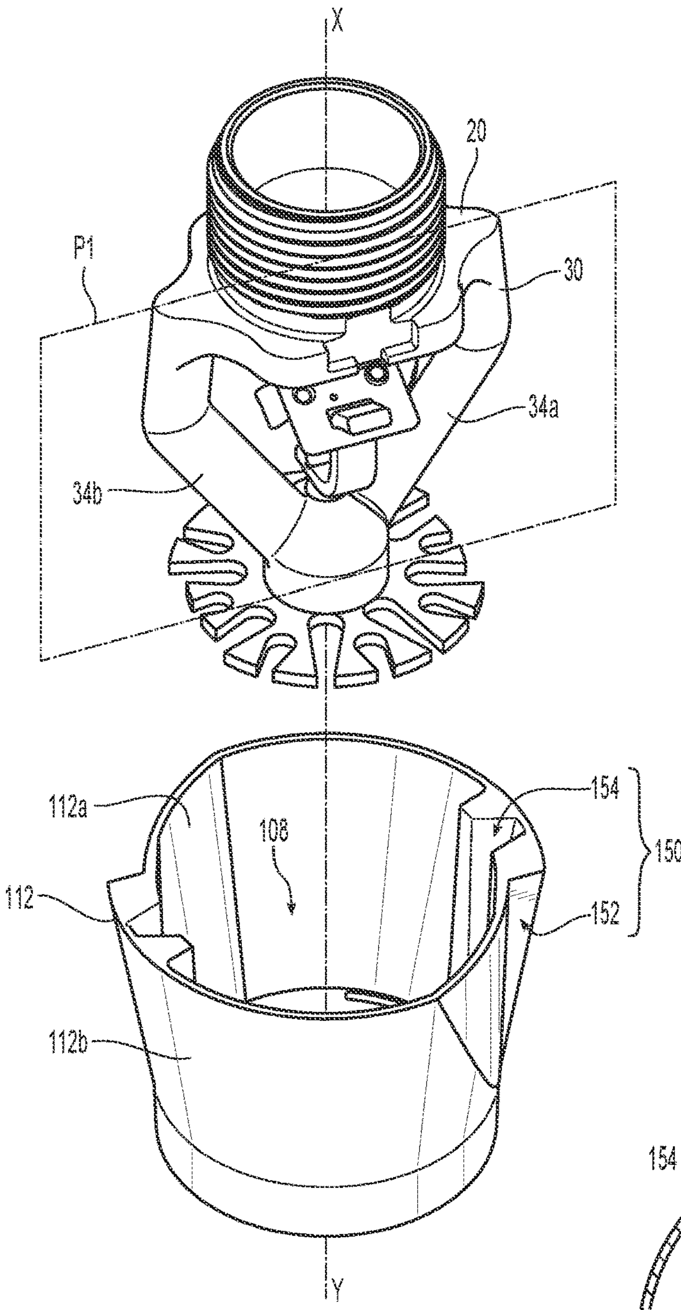
FIG. 2A is an exploded perspective view of a preferred embodiment of the protected sprinkler assembly of FIG. 1A.

Shown in FIGS. 1A, 1B and 2A are varying views, including exploded, partial cross-sectional and perspective views, of a preferred protected sprinkler assembly 10 having a fire protection sprinkler 20 and a protective device 100 for installation in a branch connector 200 of a fluid supply pipe header 300. Preferred embodiments of the protective device 100 protects the sprinkler 20 from unintentional impact and damage during storage, transport, installation and/or when awaiting to be placed into service. Moreover, the protective device 100 also serves as a tool for installing the sprinkler 20 into the branch connector 200 of a fire protection sprinkler system. More specifically, the preferred device 100 facilitates installation of the sprinkler 20 by permitting an applied hand torque to install the assembly 10 into the branch connector 200 in a fluid tight manner.

In preferred embodiments of the protected sprinkler assembly and its installation, the sprinkler 20 generally includes a frame 30 with a body 32 and a pair of frame arms 34*a*, 34*b* disposed about and extending from the body 32 and spaced apart from one another in a plane. A fluid deflection member 40 is coupled to the frame arms 34*a*, 34*b* and axially spaced from the body 32. Individually, each frame arm defines a maximum width measured in the plane and a maximum thickness measured perpendicular to the arm width. Together, the outer peripheral surfaces of the frame arms define a maximum spacing therebetween. The fluid deflection member 40 and the sprinkler 20 can be configured for installation as a pendent sprinkler, a horizontal sprinkler or an upright sprinkler. The sprinkler body 32 has a fluid inlet 31, a fluid outlet 33, defining an internal passageway 35 extending between the inlet 31 and the outlet 33 along a central sprinkler axis X-X. The body 32 is configured for installation in the branch connect and in preferred embodiments of the sprinkler 20, the body 32 includes an external thread 37 formed about the central sprinkler axis X-X for a preferably threaded connection to the branch connector 200.

The sprinkler 20 is preferably an automatic sprinkler with a thermally responsive trigger assembly 50 coaxially disposed between the body 32 and the fluid deflection member 40. The trigger assembly 50 is illustratively shown as a solder link and lever arrangement, but alternatively can be configured as a frangible glass bulb. The automatic fire protection sprinkler includes an internal seal assembly 39 that is supported in place by the thermally responsive trigger assembly 50 to maintain a fluid tight seal. Alternatively, or additionally, the trigger assembly 50 and/or seal assembly 39 can incorporate an actuator for a controlled discharge. In preferred embodiments of the sprinkler 20, the fluid deflection member is affixed to an apex 34*c* coaxially aligned the central axis X-X. In the preferred frame 30, the frame arms 34*a*, 34*b* preferably converge to form the preferred apex 34*c*. The thermally responsive trigger assembly 50 is preferably axially supported by a threaded load screw or member 60 threaded into the apex 34*c*. Accordingly, the apex 34*c* is preferably located between the thermally responsive trigger assembly 50 and the fluid deflection member 40.

The sprinkler 20 is installed and connected to the branch connector 200 by the device 100. The protective installation device 100 is subsequently removed and the sprinkler 20 is placed into service. The trigger assembly 50 is preferably configured to thermally actuate in response to a fire or sufficient level of heat. Upon thermal actuation, the seal assembly 39 is released and ejected from the outlet 33 preferably under fluid pressure delivered to the inlet 31 from the header 300 and through the branch connector 200. The firefighting fluid is discharged from the open outlet 33 for distribution by the fluid deflection member 40 to address the fire event.

Shown in the figures are various views of the protected sprinkler assembly 10 and the protection installation device 100. The preferred device 100 includes a tubular body that is preferably axially disposed about the sprinkler 20 so as to locate operative components of the sprinkler 20 within the internal protective space or void of the device 100. In preferred embodiments described herein, the protective device 100 is placed about the frame 30 to at least partially circumscribe the central sprinkler axis X-X and define an internal void for housing the automatic fire protection sprinkler 20 with a first portion for protecting the thermally responsive trigger 50 and preferably a second portion for protecting the fluid deflection member 40. The device 100 preferably includes one or more torque assist features 150 that facilitates using the device to engage the sprinkler 20 and transfer to the sprinkler 20 a torque or a rotational force, preferably a hand torque or a rotational force, for installation of the sprinkler 20 in a branch connector 200 or other suitable fitting to form a fluid tight connection.

The protective installation device 100 is preferably formed from a polymer or plastic material such as, for example, polyethylene and formed by molding such as, for example, injection molding. The device 100 is preferably formed as a tubular cap or body 102 having a first end 104 defining an opening centered about a central axis Y-Y for axially receiving the fire protection sprinkler 20 and an opposite second end 106 centered about the central axis Y-Y and axially spaced from the first end 104. The tubular body 102 defines an internal void 108 and volume between the first end 104 and the second end 106 for housing a portion of the received sprinkler 20. More particularly, the tubular body 102 includes a shielding wall portion 112 that preferably circumscribes the central axis Y-Y to define a continuous geometry about the central axis. The wall 112 preferably extends between the first end 104 and the second end 106 to define the internal void 108. Moreover, preferred embodiments of the wall portion 112 define the preferred torque assist features 150 of the device 100.

Generally, the torque assist feature 150 includes one, and preferably more than one, external rotational drive formations 152 for applying a torque to the protected fire protection sprinkler assembly 10 and one, and preferably more than one, internal rotational drive formations 154 for transferring the applied torque to the sprinkler 20 for rotation within a threaded branch connector 200 or other suitable fitting to form a fluid tight connection therebetween. In preferred embodiments of the device 100, the wall 112 defines a wall thickness that varies about the device axis Y-Y to define the preferred rotational drive formations 152, 154 of the torque assist features 150. Additionally, or alternatively, the wall thickness can vary in the axial direction between the first end 104 and the second end 106. The wall 112 preferably defines a wall thickness that can range from 0.030 to 0.060 inch and more preferably range from 0.04 to 0.005 inch. However, the wall 112 could define a wall thickness smaller or greater than the range of 0.030 to 0.060 inch provided the wall 112 provides for the preferred torque assist features 150.

Figure 2B:
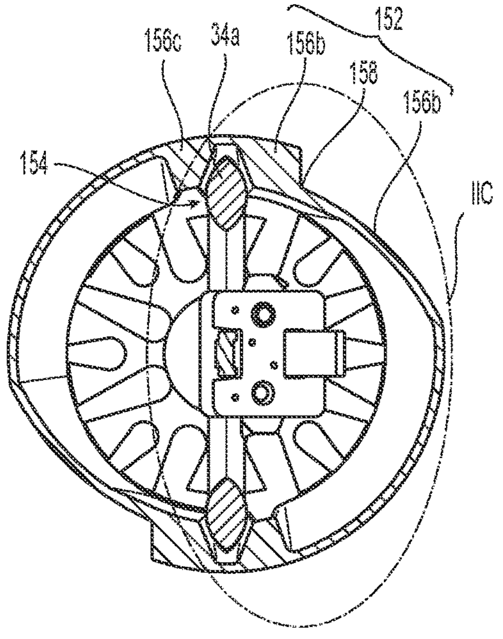
FIG. 2B is a plan cross-sectional view of the protected sprinkler assembly of FIG. 1A.
Figure 2C:
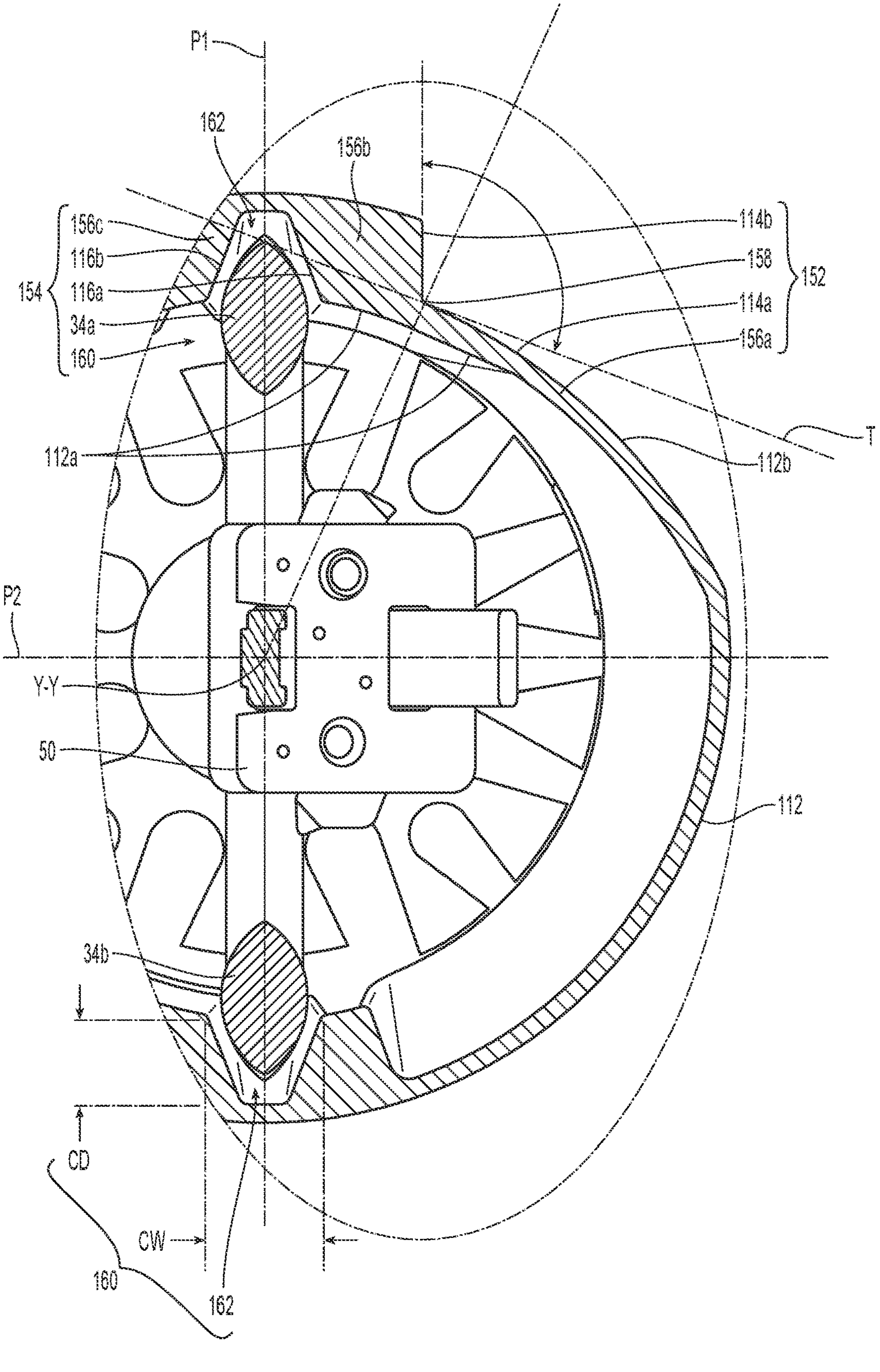
FIG. 2C is a detailed view IIC of FIG. 2B.

With reference to FIGS. 2A-2C, in preferred embodiments of the device 100, the wall 112 includes a first segment 156*a* of the wall and a second segment 156*b* of the wall contiguous with the first segment 156*a* extending in an outward direction from the first segment 156*a* to define an external inflection 158 in the continuous geometry of wall 112 about the central axis Y-Y. The second segment 156*b* preferably forms a lever for applying a torque to the protected fire protection sprinkler assembly 10. The internal rotational drive formation 154 confronts one of the frame arm 34*a*, 34*b* for transferring the applied torque to the frame arm for rotation of the fire protection sprinkler 20 about the central sprinkler axis X-X preferably within the threaded branch connector 200 in a threaded fluid tight engagement.

The wall 112 defines an internal surface 112*a* and an external or peripheral surface 112*b* of the device 100 with respect to the device axis Y-Y. In a preferred aspect each of the first and second wall segments 156*a*, 156*b* are contiguous with one another to preferably define a concave internal surface 112*a* of the wall 112 about the device axis Y-Y and the trigger assembly 50 housed within the void 108. The external surface of the first wall segment 156*a* also preferably defines a convex external surface 114*a* about the device axis Y-Y and the external surface of the second wall segment 156*b* preferably defines a planar external surface 114*b* skewed with respect to the convex external surface 114*a* of the first segment 154*a* to define the preferred external inflection 158 in the external surface 112*a* of the wall 112.

As described herein, the preferred planar external surface 114*b* provides a planar lever surface of the external rotational drive formation 152 against which an installer or user can press a thumb or finger(s) to apply a preferred hand torque. Alternatively, external surfaces of the wall 112 and segments thereof can also define different surface geometries including planar and non-planar provided the resulting surfaces can shield the sprinkler and/or provide the lever surface as described herein. With reference to the preferred embodiment of the device 100 shown in FIG. 2C, the external inflection 158 can define a tangent T to the convex external surface 114*a* of the first wall segment 156*a*.

Figure 3A:
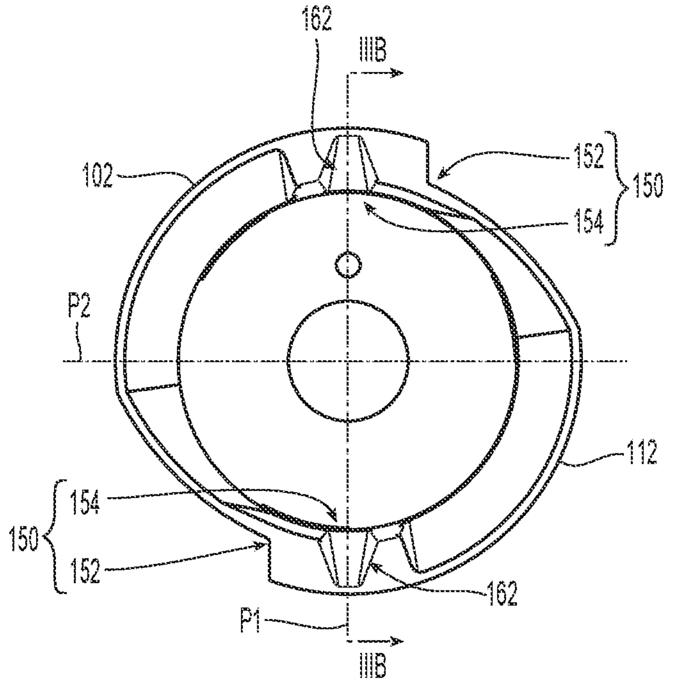
FIG. 3A is a plan view of a preferred embodiment of a protective device used in the protected sprinkler assembly of FIG. 1A.

As seen in FIG. 3A, the wall 112 can define a variety of circumscribing or closed-form geometries of the device 100 such as, for example, a rectangle, square, a polygonal or curvilinear geometry. For the device 100, the wall portion 112 defines a continuous geometry about the central axis Y-Y. The preferred torque assist features 150 of the device 100 define a preferably asymmetric continuous geometry of the wall 112 with respect to the plane P1 of the frame arms. More particularly, the preferred external rotational drive feature 152 defines the preferred asymmetric continuous geometry. In the preferred device 100, there are diametrically opposed external rotational drive features 152. Moreover, the wall 112 defines varying radii of curvature such that the wall geometry defines an asymmetric geometry about the first plane P1 and a second plane P2 perpendicular to and intersecting the first plane P1 at the device axis Y-Y.

Internally, the rotational drive formation 154 of the device 100 preferably includes another internal surface 116*a* of the second wall segment 156*b* that confronts a frame arm 34*a* of the sprinkler frame 30. Moreover, the confronting internal surface 116*a* preferably contacts the frame 34*a* to transfer the rotational force applied at the external rotational drive formation 152 to torque the sprinkler 20 for installation in branch connector 200 or other appropriate fitting. With reference to FIGS. 2A-2C and 3A-3B, it can be seen in the preferred embodiment of the device 100 that the preferred rotational internal rotational drive formation 154 includes a third wall segment 156*c* angularly spaced from the second wall segment 156*b* to define therebetween a preferred internal gripping formation 160 of the tubular body having a channel 162 for axially receiving a frame arm 34. The third wall segment 156*c* preferably includes an internal surface 116*b* that confronts the frame arm 34 opposite the confronting internal surface 116*a* of the second wall segment 156*b* to define the preferred gripping formation 160.

Figure 3B:
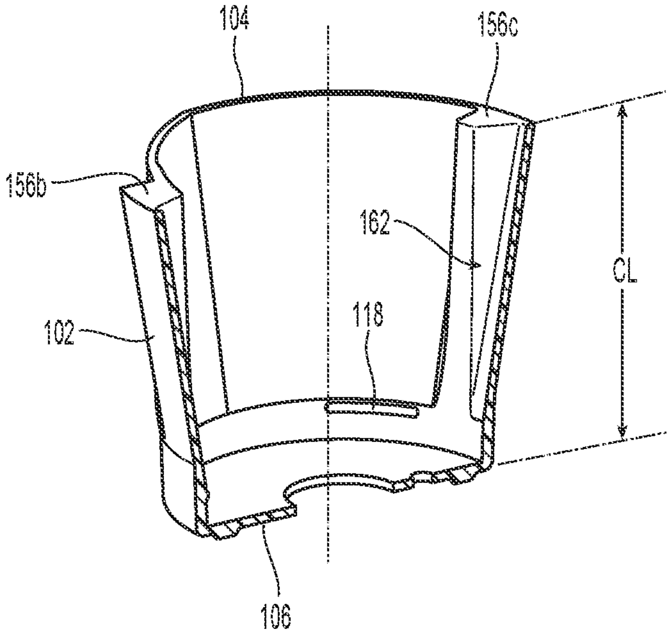
FIG. 3B is a cross-sectional perspective view of the protective device used in the protected sprinkler assembly of FIG. 1A.
Figure 3C:
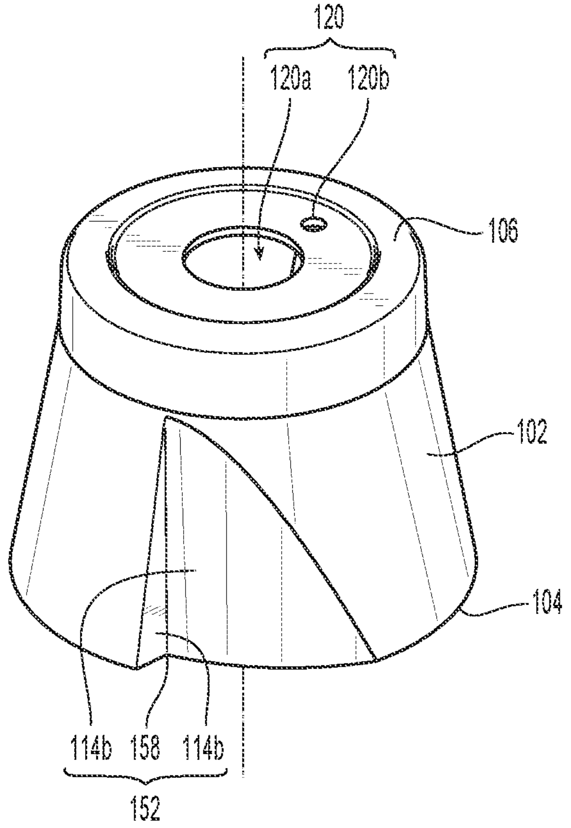
FIG. 3C is another perspective view of the protective device used in the protected sprinkler assembly of FIG. 1A.

As seen in FIGS. 2C and 3A-3B, preferred embodiments of the device 100 include two diametrically opposed internal gripping formations or portions 160 to grip each arm 34*a*, 34*b*. Each internal channel 162 of the gripping portion 160 preferably defines a channel length CL that extends axially preferably from the first end 104 to the second end 106 of the tubular body 102. The channel 162 also defines a channel width CW in the angular direction about the device axis Y-Y, and a channel depth CD in a radial direction from the device axis Y-Y. Preferred configurations of the channel 162 facilitates the device 100 forming a preferred frictional surface engagement with the sprinkler 20 that prevents or minimizes relative rotation between the device 100 and the sprinkler 20 in order to apply the torque to the sprinkler 20 for installation into the branch connector 200 in a fluid tight manner.

The opposed internal surfaces 116*a*, 116*b* can be angled toward one another and the plane P1 such that the channel width CW of the channel 162 preferably varies and the channel tapers along the channel depth in the radial outward direction, as seen in FIG. 2C. Alternatively, the internal surfaces 116*a*, 116*b* can be parallel with respect to one another and the plane P1. In a preferred embodiment, the channel width CW can vary to range between 1 to 1.1 times the thickness of a sprinkler frame arm 34, preferably between 1 to 1.05 times the thickness of the sprinkler frame arm 34; and more preferably between 1 to 1.03 times the maximum thickness of the sprinkler frame arm 34. Moreover, the channel depth CD preferably varies so that the channel tapers along the channel length CL. More particularly, the channel depth varies with the wall thickness of the wall 112 defined by the preferred second and third wall segments 156*b*, 156*c*. As seen in FIG. 3B, the wall segments 156*b*, 156*c* preferably define an internal rib formation of the device 100. Each rib preferably extends radially inward to define a wall thickness which is greater than the thinner portions of the wall 112. The rib formation preferably tapers in the direction from the first end 104 to the second end 106. Accordingly, the channel depth CD tapers in the direction from the first end 104 of the device 100 to the second end 106. At its maximum, the channel depth CD of each channel 162 preferably ranges from 30%-50% of the maximum width of the received frame arms.

The device 100 axially receives the sprinkler 20 so that the maximum channel depth CD of each gripping formation 160 or channel 162 aligns with the portion of the frame arm 34 defining the greatest radial distance from the sprinkler axis X-X as seen for example in FIG. 1B. It is believed that this maximizes the mechanical advantage of the gripping portion 160 in applying a torque to the sprinkler 20 for installation in the branch connector 200. With each of the frame arms 34*a*, 34*b* engaged within the diametrically opposed gripping channel formations 160, the sprinkler 20 is sufficiently housed within the internal volume 108 of the device 100 for application of a torque to install the sprinkler 20.

The protective device 100 is located axially to extend from the body 32 to the fluid deflection member 40. Additionally, the protective device 100 is preferably disposed about the frame 30 to expose the wrench boss of the sprinkler frame for use of the protective device in combination with a wrench to install the sprinkler. Notwithstanding, preferred embodiments of the protected sprinkler assembly 10 are configured for hand installation using the device 100 to form a fluid tight connection with a branch connector 200 or other appropriate fitting. The protective device 100 extends axially to the fluid deflection member 40 and more preferably is configured to house the fluid deflection member 40 and more preferably peripherally surrounds the fluid deflection member 40. Preferred embodiments of the protective device 100 include a first portion 100*a* protecting the thermally responsive trigger 50 and a second portion 100*b* protecting the fluid deflection member 40. In preferred embodiments, the first portion 100*a* defines a first maximum radial distance from the central sprinkler axis for protecting the thermally responsive trigger 50 assembly and the second portion 100*b* defines a second maximum radial distance from the central sprinkler axis for protecting the fluid deflection member 40 in which the second maximum radial distance is less than the first maximum radial distance.

As seen in FIG. 1B, the first protection portion 100*a* of the device 100 preferably narrows in the axial direction toward the second protection portion 100*b*. The first portion 100*a* can narrow uniformly, as shown, or alternatively narrow in a step-wise fashion. With reference to FIG. 3B, the internal surface of the device 100 in the second portion 100*b* includes one or more circumferentially extending ribs 118. The circumferential ribbing 118 extends radially inward and is preferably located to form a surface engagement and more preferably a snap-fit engagement with the fluid deflection member 40 of the inserted sprinkler 20 to secure the device 100 to the sprinkler 20 during storage. The second end 106 of the protective installation device 100 is shown in FIG. 2C. The second end 106 is shown as a preferably planar member disposed perpendicular to the device axis Y-Y for protection of the fluid deflection member 40, but can be alternatively configured, for example, with a domed geometry. The second end 106 can include one or more limited openings 120*a*, 120*b* to provide physical and/or visual access to the sprinkler 20. Moreover, an off-center opening 120*b* can be provided to provide for fluid drainage.

Referring again to FIGS. 1A and 1B, preferred embodiments of the protected sprinkler assembly 10 are configured for hand installation into the branch connector 200 in a fluid tight connection. The branch connector 200 shown is generally a tubular member having a first inlet end 212 for connection to the pipe header 300 and a second outlet end 214 for a preferred threaded connection to the fluid distribution device 20. Depending upon the configuration of the fluid deflection member 40 of the sprinkler 20, the branch connector 200 can be arranged on the header 300 for appropriate installation as pendent, an upright or a sidewall/horizontal device. The branch connector 200 can be configured as a straight fitting or alternatively can be formed as a different type of fitting, such as for example, an elbow fitting or tee fitting to connect an appropriately configured sprinkler. Preferred embodiments of the branch connector 200 include an internal annular seal member 400 for formation of a fluid tight sealed connection with the protected sprinkler assembly 20. The branch connector 200 includes a preferred internally formed gasket chamber in which an annular seal member 400 is disposed. Under load, the preferred geometry of gasket chamber of the branch connector 200 in combination with the preferred geometry of the seal member 400 provides for radial outward deformation of the seal member minimizing or eliminating interference with the flow of water through the annular seal member 400 to the sprinkler 20. The annular seal member 400 is preferably configured as the seal shown in U.S. Pat. No. 10,744,527 to provide a preferred leak-proof connection between a fire protection sprinkler or other fire protection device 20 and the branch connector 200. The material employed for seal member 400 is an EPDM material having a durometer hardness of from 65 to 80, and preferably 70, to provide the desired sealing function and maintain sprinkler position. Firefighting fluid fed into the inlet end 212 flows through the annular seal member out the outlet end 214 to supply the sprinkler 20 for discharge and distribution in accordance with the performance specification of the sprinkler 20.

The connector 200 includes an internally threaded portion proximate the outlet end 214 for coupling preferred embodiments of the protected fire protection sprinkler assembly 10 and more preferably coupling the protected sprinkler assembly 10 by hand torque using preferred embodiments of the protective device 100 described herein. The outlet end 214 and internally threaded portion is preferably configured for connection with a device 20 of a nominal size. Accordingly, preferred embodiments of the branch connector 10 at the outlet end 214 define a nominal size or diameter ranging from ½ inch to 1½ inch and more particularly any one of ½ inch, ¾ inch, 1 inch, 1¼ inch or 1½ inch. The outlet end 214 is preferably defined by a circular planar surface circumscribed and disposed orthogonally with respect to the central longitudinal axis X-X.

Generally, the external thread of the body 32 of the protected fire protection sprinkler 20 is of a tapered form, for example, NPT thread. The internal threaded portion preferably includes an internal straight thread for receipt of the tapered sprinkler thread of the sprinkler 20. The threaded engagement remains sealed from fluid supplied through the inlet 212 end by the proper fluid tight seal sealed engagement between the seal member 400 and the sprinkler 20. The internal diameter ID of the internal straight thread can be defined by any one of the pitch diameter, minor diameter or major diameter of the internal thread provided the straight thread engages the tapered thread of the sprinkler 20. The internal straight thread can be for example, a 1-11.5 NPSH Thread; a ¾-14 NPSH Thread; or a ½-14 NPS Thread for mating with a correspondingly nominal 1 inch, ¾ inch or ½ inch fire protection sprinkler.

Use of the preferred straight internal thread permits preferred embodiments of the protected sprinkler assembly 10 to be rotatable about the axis X-X within the branch connector 200, preferably by hand, in any desired position while forming a proper fluid tight seal. More preferably, the internal thread portion and the seal member 400 form a proper fluid tight seal engagement with the sprinkler 20 upon sufficient hand torque using preferred embodiments of the protective device 100. Threaded installation of the sprinkler 20 deforms the annular seal member 400 and provide a leak-proof fluid-tight seal between the sprinkler 20 and the branch connector 200. The connection between the branch connector 200 and the sprinkler 20 is sufficient to provide a fluid tight seal under a fluid pressure of up to 200 psi or more, for example, pressures of up to and including at least 175 psi.

The discharge or flow characteristics from the sprinkler body 32 is defined by the internal geometry of the sprinkler including its internal passageway, inlet and outlet (the orifice). Generally, the size of the sprinkler discharge orifice is defined by the nominal K-factor of a sprinkler. For a given sprinkler assembly, the larger the K-factor, the larger the discharge orifice, and the smaller the K-factor, the smaller the discharge orifice. Nominal K-factors for sprinklers listed in the National Fire Protection Association Standard Publication, *NFPA* 13*: Standard for the Installation of Sprinkler Systems*, can range from 1 to 30 [GPM/(psi.)$^{1/2}$] and greater. NFPA 13 identifies the following nominal K-factors of 14 or greater: 14 [GPM/(psi.)$^{1/2}$] ("K14"); 16.8 [GPM/(psi.)$^{1/2}$] ("K16.8"); 19.6 [GPM/(psi.)$^{1/2}$] ("K19.6"); 22.4 [GPM/(psi.)$^{1/2}$] ("K22.4"); 25.2 [GPM/(psi.)$^{1/2}$] ("K25.2") and 28.0 [GPM/(psi.)$^{1/2}$] ("K28"). Even larger nominal K-factors are also possible. As is known in the art, the K-factor of a sprinkler is defined as $K=Q/P^{1/2}$, where Q represents the flow rate (in gallons/min GPM) of water from the outlet of the internal passage through the sprinkler body and P represents the pressure (in pounds per square inch (psi.)) of water or firefighting fluid fed into the inlet end of the internal passageway through the sprinkler body. Accordingly, the designed performance of a sprinkler is a function of the supply of a minimum fluid pressure or flow.

The length L of the branch connector 200 is preferably defined between the outlet end 214 and a mid-point of the concave portion of the saddle-shaped inlet 212. The overall length L of the branch connector between the inlet end 212 and the outlet end 214 preferably ranges from 1 inch to 1½ inch. Moreover, the overall length L of the branch connector 200 preferably corresponds or varies with the outlet nominal diameter size. For example, for a nominal outlet diameter of 1 inch, the length L is preferably 1¼ inch, where the nominal outlet diameter is ¾ inch, the length L is preferably 1⅛ inch and where the nominal outlet diameter is ½ inch, the length L is preferably 1 1/16 inch. The preferred sprinkler assembly 10 could be used with other known branch connectors shown and described, for example, in each of U.S. Pat. Nos. 8,297,663 and 10,744,527 and U.S. Patent Publication No. 2019/0175968.

Figure 4:
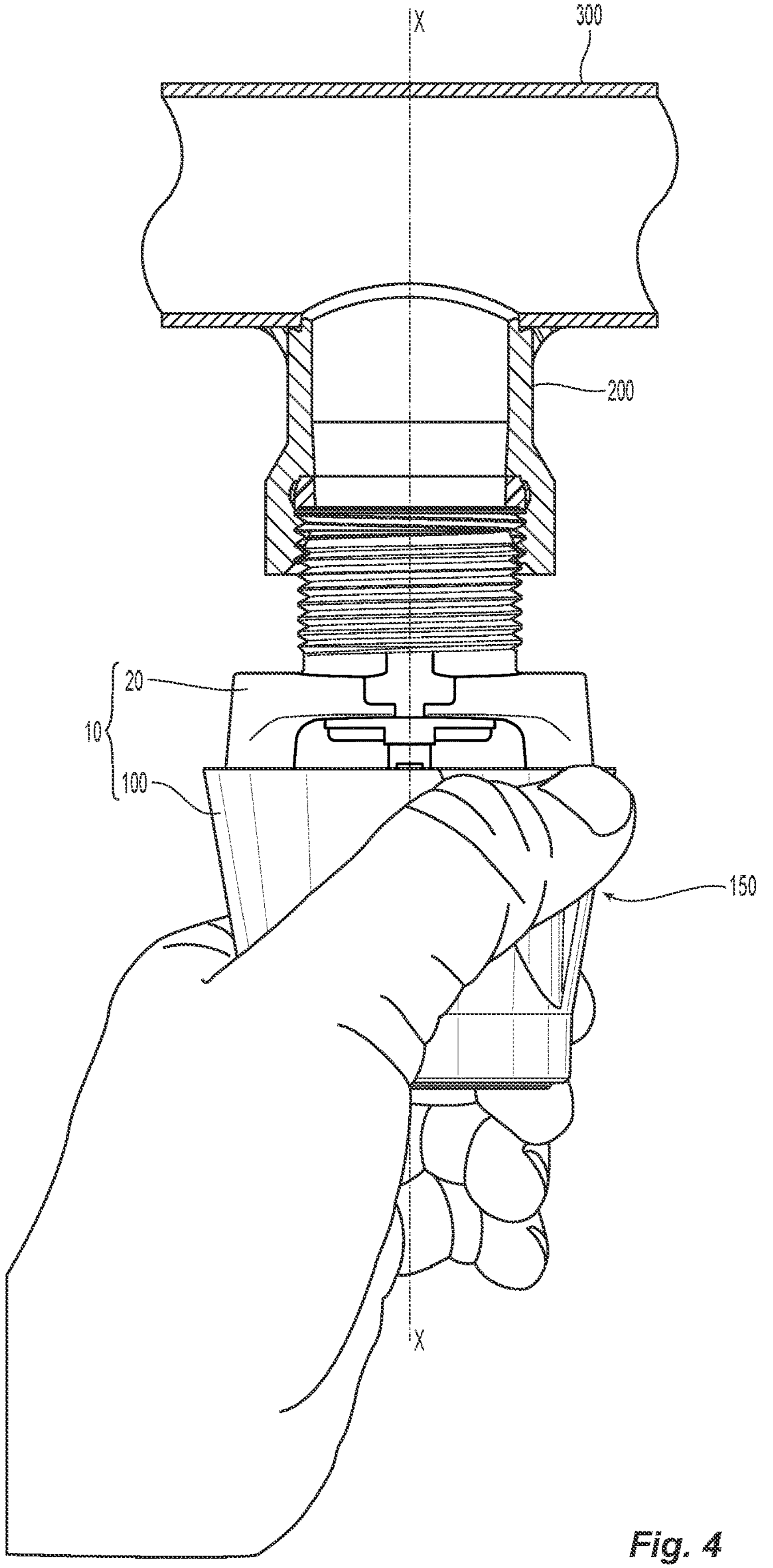
FIG. 4 is an illustration of the preferred protected sprinkler assembly in FIG. 1A being installed by hand.

In preferred embodiments of the protective device 100, the device can be grasped by hand as illustrated in FIG. 4. Illustrated in FIG. 4 is the protected sprinkler assembly 10 being installed into the branch connector by hand. The preferred protective device 100 peripherally protects operative components of the sprinkler 20 including the trigger and the fluid deflection member. The preferred external rotational drive formation 152 provides a finger rest and more preferably a thumb rest against which the installer can exert a force to torque the sprinkler 20 into the branch connector 200. With a thumb exerted against the preferred lever surface 114*b*, the remaining fingers can curl about the device 100. Accordingly, the device 100 can protect the operator's hand from the surface edges of the sprinkler 20.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A protected fire protection sprinkler assembly comprising:
- a fire protection sprinkler including:
  - a frame having a body having an inlet, an outlet, an internal passageway extending between the inlet and the outlet along a central sprinkler axis, and an external thread formed about the central sprinkler axis, the frame including a pair of spaced apart frame arms disposed in a plane and extending axially from the body;
  - a fluid deflector affixed to the frame arms and centered along the central sprinkler axis;
  - a thermally responsive trigger assembly aligned along the central sprinkler axis; and
  - a protection and installation device axially engaged with the fire protection sprinkler including a tubular body having a first end defining an opening for axial receipt of the fire protection sprinkler, a second end axially spaced from the first end for at least partially shielding the fire protection sprinkler, and a shielding wall between the first end and the second end defining a continuous geometry circumscribed about a central device axis and an internal void for housing the fire protection sprinkler, the tubular body having a torque assist feature defined by:
  - at least one external rotational drive formation that includes a first segment of the wall and a second segment of the shielding wall contiguous with the first segment and extending in an outward direction from the first segment to define an external inflection in the continuous geometry and form a lever for applying a torque to the protected fire protection sprinkler assembly; and
- at least one internal rotational drive formation confronting one arm in the pair of arms for transferring the applied torque to the frame arm for rotation of the fire protection sprinkler about the central sprinkler axis within a threaded branch connector in a threaded engagement with the external thread of the body,
- wherein the at least one internal rotational drive formation includes an internal surface of the second segment confronting the one arm in the pair of arms, and
- wherein the at least one internal rotational drive formation includes a third segment angularly spaced from the second segment to define therebetween at least one internal gripping formation of the tubular body having a channel for axially receiving the one frame arm in the pair of frame arms, the third segment including an internal surface of the tubular body confronting the one frame arm opposite the internal surface of the second segment.

2. The assembly of claim 1, wherein the channel defines a channel length extending axially from the first end to the second end, a channel width in an angular direction about the device axis, and a channel depth in a radial direction from the device axis, the channel depth defining a maximum channel depth that is at least 30%-50% a maximum width of the frame arms.

3. The assembly of claim 2, wherein the channel depth varies so that the channel tapers along the channel length and wherein the channel width varies so that the channel tapers along the channel depth.

4. The assembly of claim 1, wherein the at least one internal gripping formation of the tubular body includes a pair of diametrically opposed gripping portions.

5. The assembly of claim 1, wherein the at least one external rotational drive formation includes a pair of diametrically opposed external rotational drive formations and the at least one internal rotational drive formation includes a pair of diametrically opposed internal drive formations.

6. A protected fire protection sprinkler assembly comprising:
- a fire protection sprinkler including:
  - a frame having a body having an inlet, an outlet, an internal passageway extending between the inlet and the outlet along a central sprinkler axis, and an external thread formed about the central sprinkler axis, the frame including a pair of spaced apart frame arms disposed in a plane and extending axially from the body;
  - a fluid deflector affixed to the frame arms and centered along the central sprinkler axis;
  - a thermally responsive trigger assembly aligned along the central sprinkler axis; and
  - a protection and installation device axially engaged with the fire protection sprinkler including a tubular body having a first end defining an opening for axial receipt of the fire protection sprinkler, a second end axially spaced from the first end for at least partially shielding the fire protection sprinkler, and a shielding wall between the first end and the second end defining a continuous geometry circumscribed about a central device axis and an internal void for housing the fire protection sprinkler, the tubular body having a torque assist feature defined by:
  - at least one external rotational drive formation that includes a first segment of the wall and a second segment of the shielding wall contiguous with the first segment and extending in an outward direction from the first segment to define an external inflection in the continuous geometry and form a lever for applying a torque to the protected fire protection sprinkler assembly; and at least one internal rotational drive formation confronting one arm in the pair of arms for transferring the applied torque to the frame arm for rotation of the fire protection sprinkler about the central sprinkler axis within a threaded branch connector in a threaded engagement with the external thread of the body, wherein the at least one external rotational drive formation includes a pair of diametrically opposed external rotational drive formations and the at least one internal rotational drive formation includes a pair of diametrically opposed internal drive formations, and wherein the plane defines a first plane, at least a portion of the tubular body including the first end is asymmetrical about the first plane, the portion of the tubular body being asymmetrical about a second plane perpendicular to the first plane.

7. The assembly of claim 6, wherein each of the first and second segments are contiguous with one another to define a concave internal surface of the shielding wall about the central device axis.

8. The assembly of claim 6, wherein the first segment includes a convex external surface about the central device axis and the second segment includes a planar external surface skewed with respect to the convex external surface of the first segment to define the external inflection.

9. The assembly of claim 8, wherein the external inflection defines a tangent to the convex external surface of the first segment, the planar external surface of the second segment and the tangent defining an included angle therebetween that ranges from 90 to 135 degrees.

10. The assembly of claim 8, wherein the planar external surface extends parallel to the plane.

11. The assembly of claim 6, wherein the at least one internal rotational drive formation includes an internal surface of the second segment confronting one arm in the pair of arms.

12. The assembly of claim 11, wherein the at least one internal rotational drive formation includes a third segment angularly spaced from the second segment to define therebetween at least one internal gripping formation of the tubular body having a channel for axially receiving the one frame arm in the pair of frame arms, the third segment including an internal surface of the tubular body confronting the one frame arm opposite the internal surface of the second segment.

13. The assembly of claim 6, wherein the second end is circular and centered about the device axis.

14. The assembly of claim 6, wherein the at least one internal rotational drive formation is defined by diametrically opposed internal gripping formations, each internal gripping formation including a pair of internal ribs extending axially from the first end to the second end, the pair of ribs being angularly spaced from one another to define an internal channel of the gripping formation having a channel length extending axially from the first end to the second end and a channel depth in a radial direction defining a maximum channel depth that is at least 30%-50% a maximum width of the frame arms.

15. The assembly of claim 14, wherein the tubular body has a first protective portion including the first end for protecting the thermally responsive trigger assembly; and a second protective portion including the second end for protecting the fluid deflector, the second protective portion includes a circumferential rib for forming a snap fit engagement with the fluid deflector.

16. The assembly of claim 6, wherein the wall circumscribes the thermally responsive trigger assembly, the thermally responsive trigger assembly comprises one of a soldered link and lever arrangement or a frangible glass bulb.

17. A protective device for a fire protection sprinkler comprising:

a tubular body having a first end defining an opening for axially receiving the fire protection sprinkler, a second end axially spaced from the first end along a central axis, a wall between the first end and the second end that continuously circumscribes the central axis to define an internal void of the body for housing a portion of the received sprinkler; and at least one external rotational drive formation of the wall that includes a first external surface portion of a first segment of the wall and a second external surface portion of a second segment of the wall contiguous with the first external surface portion, with the second external surface portion extending in an outward direction from the first external surface portion to define an external inflection in the wall, wherein the at least one external rotational drive formation includes a pair of diametrically opposed external rotational drive formations and the tubular body includes a pair of diametrically opposed internal drive formations, and wherein at least a portion of the tubular body includes the first end is asymmetrical about a first plane aligned along the pair of diametrically opposed internal drive formations, the portion of the tubular body being asymmetrical about a second plane perpendicular to the first plane.

18. The device of claim 17, wherein the first external surface portion is a convex external surface about the central axis and the second external surface portion is a planar external surface skewed with respect to the convex external surface of the first segment to define the external inflection.

19. The device of claim 18, wherein the external inflection defines a tangent to concave the convex external surface of the first segment, the planar external surface of the second segment and the tangent defining an included angle therebetween that ranges from 90 to 135 degrees.

20. The device of claim 17, wherein the first external surface portion is a convex external surface about the central axis and the second external surface portion is a planar external surface that extends parallel to the first plane and skewed with respect to the convex external surface.

* * * * *